US010564947B2

(12) United States Patent
Meyer et al.

(10) Patent No.: US 10,564,947 B2
(45) Date of Patent: Feb. 18, 2020

(54) COMPUTER SYSTEM AND METHOD FOR MULTI-PROCESSOR COMMUNICATION

(71) Applicant: Karlsruhe Institute of Technology, Karlsruhe (DE)

(72) Inventors: Johannes Meyer, Oberreichenbach (DE); Oliver Oey, Karlsruhe (DE); Timo Stripf, Karlsruhe (DE); Jürgen Becker, Jockgrim (DE)

(73) Assignee: Karlsruhe Institute of Technology, Karlsruhe (DE)

( * ) Notice: Subject to any disclaimer, the term of this patent is extended or adjusted under 35 U.S.C. 154(b) by 0 days.

(21) Appl. No.: 15/875,553

(22) Filed: Jan. 19, 2018

(65) Prior Publication Data
US 2018/0143813 A1 May 24, 2018

Related U.S. Application Data

(63) Continuation of application No. PCT/EP2016/065652, filed on Jul. 4, 2016.

(30) Foreign Application Priority Data

Jul. 23, 2015 (EP) .................................... 15178076

(51) Int. Cl.
*G06F 9/44* (2018.01)
*G06F 8/41* (2018.01)
*G06F 9/445* (2018.01)

(52) U.S. Cl.
CPC .............. *G06F 8/443* (2013.01); *G06F 8/433* (2013.01); *G06F 8/456* (2013.01); *G06F 8/457* (2013.01);
(Continued)

(58) Field of Classification Search
CPC .... G06F 8/4432; G06F 8/4434; G06F 8/4441; G06F 8/445
See application file for complete search history.

(56) References Cited

U.S. PATENT DOCUMENTS 6,654,952 B1 * 11/2003 Nair ........................ G06F 8/433
717/143
2007/0255929 A1 * 11/2007 Kasahara .............. G06F 1/3203
712/1
(Continued)

OTHER PUBLICATIONS

Ramshankar Chouhan et al., Pertinent Path Profiling: Tracking Interactions among Relevant Statements, IEEE, 2013, retrieved online on Oct. 7, 2019, pp. 1-12. Retrieved from the Internet: <URL: http://delivery.acm.org/10.1145/2500000/2495922/06494983.pdf?>. (Year: 2013).*
(Continued)

*Primary Examiner* — Hanh Thi-Minh Bui
(74) *Attorney, Agent, or Firm* — Brake Hughes Bellermann LLP

(57) ABSTRACT

A compiler system, computer-implemented method and computer program product for optimizing a program for multi-processor system execution. The compiler includes an interface component configured to load from a storage component program code to be executed by one or more processors (P1 to Pn) of a multi-processor system. The compiler further includes a static analysis component configured to determine data dependencies) within the program code, and further determines all basic blocks of the control flow graph providing potential insertion positions along paths where communication statements can be inserted to enable data flow between different processors at runtime. An evaluation function component of the compiler is configured to evaluate each potential insertion position with regards to its impact on program execution on the multi-processor
(Continued)

system at runtime by using a predefined execution evaluation function.

19 Claims, 6 Drawing Sheets

(52) U.S. Cl.
CPC .......... *G06F 8/4432* (2013.01); *G06F 8/4434* (2013.01); *G06F 8/4441* (2013.01); *G06F 9/445* (2013.01)

(56) References Cited

U.S. PATENT DOCUMENTS

| | | | |
|---|---|---|---|
| 2014/0019782 A1* | 1/2014 | Son | G06F 1/3203 713/300 |
| 2015/0149988 A1* | 5/2015 | Nakaike | G06F 8/433 717/156 |

OTHER PUBLICATIONS

Tao Scharel et al., The CSI Framework for Compiler-Inserted Program Instrumentation, ACM, 2018, retrieved online on Oct. 7, 2019, pp. 100-102. Retrieved from the Internet: <URL: http://delivery.acm.org/10.1145/3220000/3219657/p100-schardl.pdf?>. (Year: 2018).*

European Search Report for EP Application No. 15178076.4 dated Dec. 4, 2015, 9 pages.

International Search Report and Written Opinion for PCT/EP2016/065652, dated Oct. 19, 2016, 8 pages.

Goulas, et al., "Coarse-Grain Optimization and Code Generation for Embedded Multicore Systems", 2013 Euromicro Conference on Digital System Design, IEEE, Sep. 4, 2013, pp. 379-386.

* cited by examiner

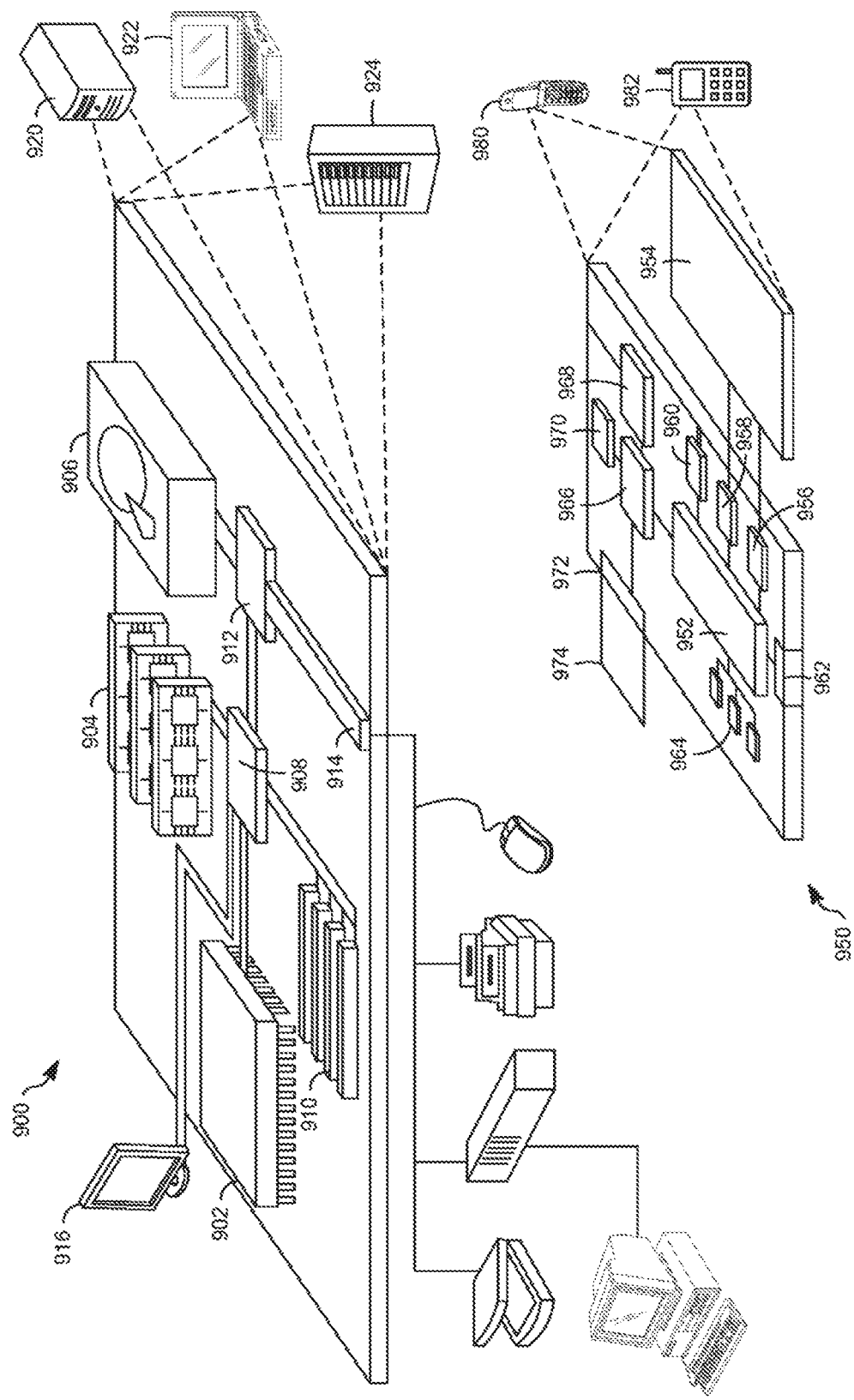

COMPUTER SYSTEM AND METHOD FOR MULTI-PROCESSOR COMMUNICATION

CROSS REFERENCE TO RELATED APPLICATIONS

This application claims priority to, and is a continuation of, PCT Application No. PCT/EP2016/065652, filed on Jul. 4, 2016, entitled "COMPUTER SYSTEM AND METHOD FOR MULTI-PROCESSOR COMMUNICATION," which, in turn, claims the benefit of priority based on EP Application No. 15178076.4, filed on Jul. 23, 2015, both of which are hereby incorporated by reference.

TECHNICAL FIELD

The present disclosure generally relates to multi-processor systems, and more particularly, relates to methods, computer program products, and systems for optimizing communication of multi-processor systems.

BACKGROUND

Multi-processor systems are often used to speed up large computing tasks by splitting the tasks into portions which can be handled by different data processing units being able to communicate with each other. The different data processing units can then work in parallel on a computing task. The data processing units are often also referred to as central processing units (CPUs) or cores. That is, a multi-processor system is a computer system which has two or more CPUs/cores to which different processes can be assigned for execution. In the following, such data processing units are referred to as processors.

If a program is to be executed on a multi-processor system, there may be different code portions of the program which are assigned to different data processing units. For example, the task of the program may be the sharpening of a large digital image and different processing units of the multi-processor system may be assigned to perform this task for different sections of the digital image. The sharpening algorithm performed by a particular processing unit may require data from the environment of a particular pixel which is currently processed by the particular processing unit. In other words, data that lies within the section processed by one of the other processors may be needed by the particular processing unit. In such a case, there may be a write operation for a particular variable to be executed by a first processing unit and a read operation for the same particular variable to be executed by a second processing unit. In such a case, a data dependency exists within the program which requires a communication between the first and second processors to enable the data flow. For this purpose, some multi-processor compiler systems insert communication statements into the program to enable the communication between the first and second processors. However, inserting the communication statements at sub-optimal positions in the program at compile time can have a negative impact on the performance, power consumption, delay and/or resource requirements and result in poor execution of the program at runtime.

SUMMARY

There is a need for a compiler system, a compile method, and a corresponding compiler program to optimize a computer program at compile time for optimal multi-processor system execution. This technical problem is solved by the compiler system, compile method and corresponding compiler program as described throughout this disclosure.

A compiler within the meaning of this disclosure does not necessarily need to provide byte code. In fact, any transformation of program code into another program code is included in the term compiling, as used throughout this document. The systems and methods described herein provide an advantage for embedded systems in that time-critical reaction at runtime is provided to ensure that the limited memory size available is sufficiently utilized. In some implementations, there is a need to generate resource efficient programs where the resource consumption is predictable and system administrational efforts at runtime are reduced. The solutions described herein provide a compile method where, dependent on the insertion position of communication statements, the performance, power consumption, delay, and/or resource requirements of the program are optimized for runtime execution.

In one general aspect, a multi-processor compiler system includes an interface component configured to load program code from a storage component. The program code is configured to be executed by one or more processors of a multi-processor system. For example, the program code may initially be written for execution by a single processor. Alternatively, the program code may already be written to be executed on multiple processors. For example, the program code can be code in any programming language which is appropriate for multi-processor execution and which is appropriate to be subject to a static analysis. Program code can be subject to static analysis if it is possible to extract, at compile time, the control flow and the data flow of the program from the program code. For example, program code which does not include dynamic pointer arithmetic or function calls with variables passed by reference can always be subject to static analysis. The presence of pointer arithmetic or other constructs which influence the control flow at runtime of the program may in some cases prevent the determination of the control flow and data flow at compile time. Such programs may not be suitable for static analysis.

The compiler system further has a static analysis component configured to generate from the program code a control flow graph representing all paths that can be traversed through the execution of the respective program. A control flow graph (CFG) in computer science is a representation, using graph notation, of all paths that might be traversed through a program during its execution.

In a control flow graph, each node in the graph represents a basic block, i.e. a straight-line piece of code without any jumps or jump targets in between; jump targets start a block, and jumps end a block. Directed edges are used to represent jumps in the control flow or to connect consecutive blocks. There are, in many representations, two specially designated blocks: the entry block, through which control flow enters into the flow graph, and the exit block, through which all control flow leaves.

For example in the case of assembler code, the CFG can be obtained, at least conceptually, by starting from the program's (full) flow graph—i.e., the graph in which every node represents an individual instruction—and performing an edge contraction for every edge whose source has a single exit and whose destination has a single entry. Alternatively, the CFG can be constructed directly from the program by scanning, for example, the abstract syntax tree (AST) of the program for basic blocks. In order to bypass some inadequacies in some programming languages (e.g., programming language C), empty basic blocks may be inserted as placeholders for the insertion of communication statements before control structures like for-loops. Furthermore, trivial basic blocks with a single exit and a single entry edge may exist to enable an unambiguous mapping to AST structures.

A mapper component can be used to assign a particular data processing unit (processor) to every statement of the program code. For example, the assignment of a particular data processing unit can occur at the level of basic blocks in the CFG because all instructions of a particular basic block are executed when the respective basic block is executed.

The static analysis component is further configured to determine data dependencies within the program code and to determine all basic blocks of the CFG providing potential insertion positions along paths where communication statements can be inserted to enable data flow between different processors at runtime.

For example, the static analysis component can identify at least one data dependency between a first statement in a first basic block and a second statement in a second basic block where a data flow is required from a first processor to a second processor of the multi-processor system. Further, it can identify all paths between the first basic block and the second basic block in the CFG.

The compiler system further has an evaluation function component configured to evaluate each potential insertion position with regards to its impact on program execution on the multi-processor system at runtime by using a predefined execution evaluation function.

The execution evaluation function may use weighting metrics for the evaluation of basic blocks wherein weights are defined in relation to the frequency of execution of the basic blocks. In particular, a basic block in a loop structure may have a higher weight than a basic block which is executed only once in a main path. A basic block in a main path may have a higher weight than a basic block in a branching path.

In one embodiment, the static analysis component may be further configured to determine at least one potential set of insertion positions such that for each set each identified path is covered by at least one communication statement of the set. The code modification component is further configured to insert coupled send and receive communication statements at a particular set of insertion positions such that the evaluation of the particular set of insertion positions out of the potential sets of insertion positions is optimal in view of the respective evaluation values. A particular pair of send and receive communication statements can include consecutive statements in one of the one or more optimized program codes. Alternatively, the send and receive statement pairs can be separated by other program statements. In general, coupled send and receive communication statements enable the flow of data from one processor to another processor at runtime.

A code modification component of the compiler system is configured to obtain one or more optimized program codes from the program code by inserting pairs of send and receive communication instructions in each relevant path of the control flow graph at one or more insertion positions. Each insertion position has an evaluation value which indicates optimal runtime execution for the program when executed on the multi-processor system. Thereby, each optimized program code is configured to be executed by a particular processor of the multi-processor system. The one or more optimized program codes are then provided through the interface component to the storage component for storing. From there they can be loaded for execution or simulation purposes. The optimized program code(s) do not need to be in an executable format at this point in time. They may still be compiled for the multi-processor system by a further appropriate compiler component.

In one embodiment, a computer-implemented method for optimizing a program for multi-processor system execution starts with loading a program code of the program wherein the program is to be executed by at least one processor. Then, as a result of a static analysis of the program code, a control flow graph (CFG) is generated. The CFG represents all paths that can be traversed through the execution of the program. Further, data dependencies are determined between pairs of statements of the program code. Thereby, each statement is contained by exactly one basic block of the CFG.

A mapping is received which includes for each statement within each basic block of the control flow graph an assignment of the statement to a particular processor of a multi-processor system. The mapping may already be received earlier as it does not depend on the previous steps. In principle, the mapping can be received right after the loading of the program code. The mapping may result from a manual assignment of processors to respective basic blocks or it may be provided by tools which can perform an automatic parallelization. Examples of such tools are "Pareon Profile" (provided by Vector Fabrics B.V., L J Zaltbommel, The Netherlands), "SLX Mapper" (provided by Silexica Software Solutions GmbH, Aachen, Germany), or "Silkan Wild Cruncher" (provided by SILKAN, Meudon la Forêt, France).

At least one data dependency is identified between a first statement in a first basic block and a second statement in a second basic block. The data dependency in view of the mapping requires a data flow from a first processor to a second processor of the multi-processor system. Then, all paths between the first basic block and the second basic block are identified in the CFG. Then, all basic blocks are determined which provide potential insertion positions along the identified paths where communication statements can be inserted to enable the data flow at runtime.

Each potential insertion position is evaluated, by using a predefined execution evaluation function, with regards to its impact on the execution of the program on the multi-processor system. Finally, optimized program code is obtained by inserting coupled send and receive communication statements such that each identified path has at least one receive and one send communication statement. Thereby, each insertion position has an evaluation value which indicates optimal runtime execution of the program when executed on the multi-processor system.

The optimized program code can then be executed on the multi-processor system wherein the first basic block is executed by the first processor and the second basic block is executed by the second processor and the execution of inserted communication statements causes a data transfer from the first processor to the second processor.

The optimized program code can be executed by a multi-processor simulation system to test the execution behavior of the optimized program code. For example, when the optimized program code is generated for use in embedded systems, it can be advantageous to simulate the behavior before loading the program code into the embedded system to virtually investigate the behavior of the system under study.

In one embodiment, the information acquired through simulation or execution on real hardware is used to enable a profile-based optimization. Thereby, the information is used by the evaluation function resulting in further optimized runtime execution.

In one embodiment, the step determining all basic blocks can further include: determining at least one potential set of insertion positions such that for each set each identified path is covered by at least one communication statement of the set, and the step inserting the communication statements can further include inserting pairs of send and receive communication statements at a particular set of insertion positions such that the evaluation of the particular set of insertion positions out of the potential sets of insertion positions is optimal in view of the respective evaluation values. This embodiment is particular advantageous for program codes with complex CFGs with a plurality of branch paths because it ensures that all branches are covered with communication instructions.

In one embodiment, a computer program product includes computer-readable instructions that when loaded into a memory of the compiler system and executed by one or more processors of the compiler system cause the compiler system to perform the previously described method.

Further aspects of the present disclosure will be realized and attained by means of the elements and combinations particularly depicted in the appended claims. It is to be understood that both, the foregoing general description and the following detailed description are exemplary and explanatory only and are not restrictive of the present disclosure as described.

BRIEF DESCRIPTION OF THE DRAWINGS

FIG. 6 is a diagram that shows an example of a generic computer device and a generic mobile computer device, which may be used with the techniques described here.

DETAILED DESCRIPTION

Figure 1:
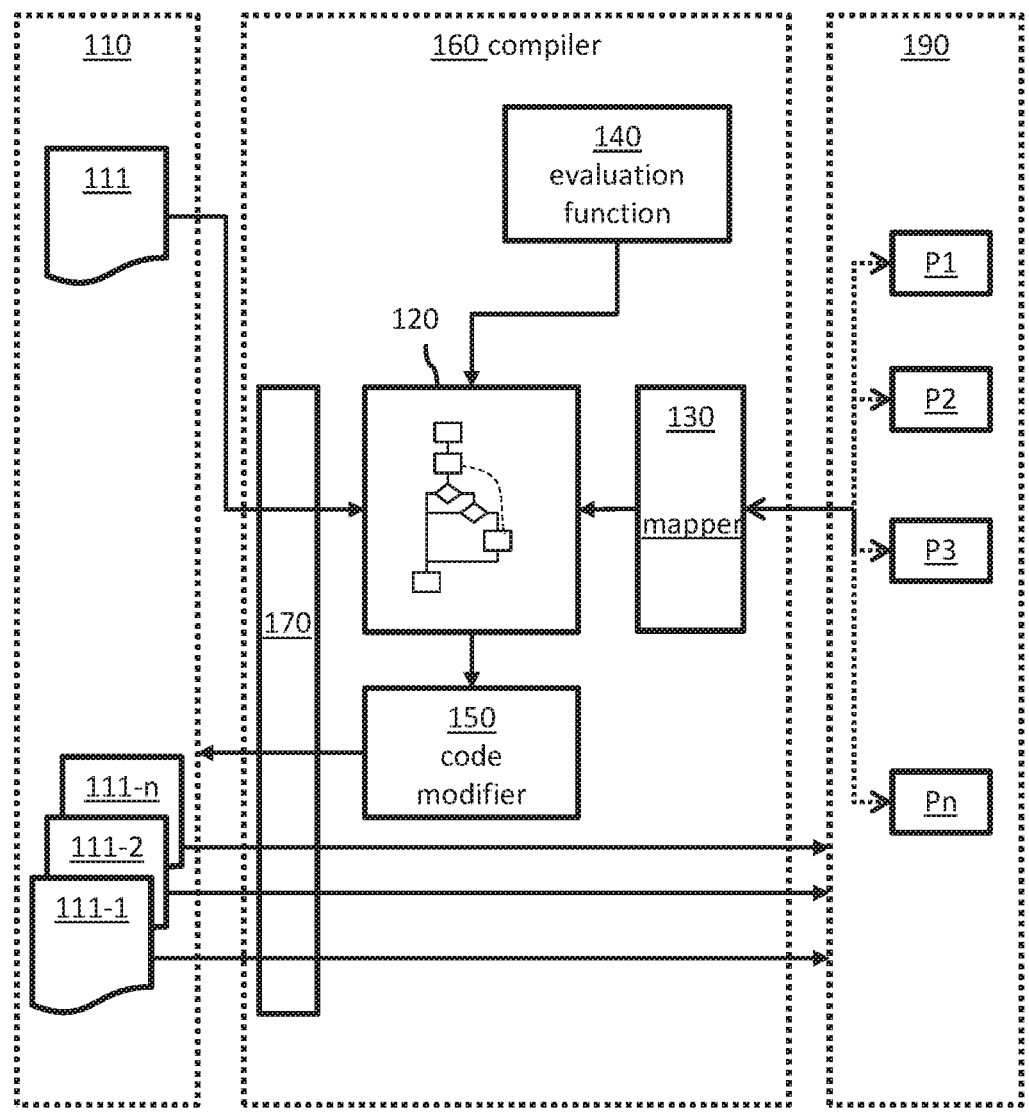
FIG. 1 is a simplified block diagram of a computer system including a compiler system according to an embodiment of the present disclosure for optimizing a program for multi-processor system execution.
Figure 2:
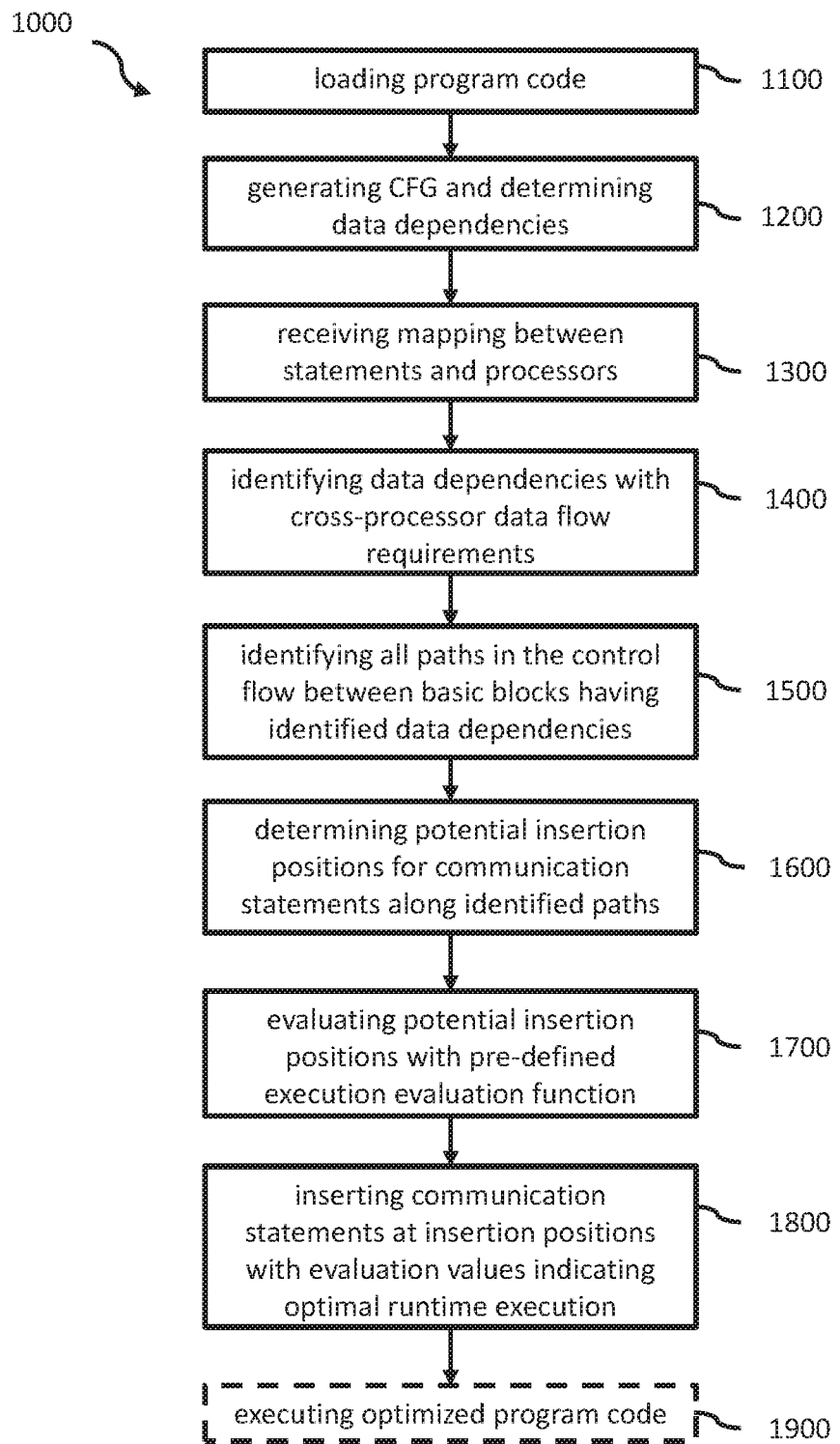
FIG. 2 is a simplified flow chart of a computer-implemented method for optimizing a program for multi-processor system execution according to an embodiment of the present disclosure.

FIG. 1 is a simplified block diagram of a computer system including a compiler system 160 according to an embodiment of the present disclosure for optimizing a program for multi-processor system execution. FIG. 1 will be described in the context of FIG. 2 which is a simplified flow chart of a computer-implemented method 1000 for optimizing a program for multi-processor system execution according to an embodiment of the present disclosure. Reference numbers may refer to FIG. 1 and FIG. 2.

The system 100 includes a storage component 110 where program code files 111, 111-1 to 111-n can be stored. Any appropriate memory component can be used. For example, a file system, database or the main memory may be used to organize the various program codes in the storage component 110. For example, the storage component 110 can be an integral part of the compiler system 160. However, alternatively, the storage component can be a remote device which is communicatively coupled with the compiler system 160. For example, cloud storage devices may be used.

At least one program code 111 which is stored in the storage component 110 relates to a program to be executed by at least one processor P1 to Pn of a multi-processor system 190. The multi-processor system may be a remote system which is communicatively coupled with the compiler system 160. The multi-processor system can also be a virtual system combining multiple systems, each with one or more processors, into a virtual system. Any configuration of the multi-processor system 190 may be used which allows to use the processors P1 to Pn for executing programs whose program codes are stored in the storage component. For example, the multi-processor system 190 can be used to perform parallel execution of a program code which is written to support parallelization.

The compiler system 160 can load 1100 the program code 111 of the program from the storage component 110 via an appropriate interface 170. For example, the program code 111 may be generic and can be optimized for the processors at a later point in time or it may already be configured to be executed by at least one of the processors P1 to Pn. For example, the program code may originally be designed to be executed by a single processor (e.g., P1).

The compiler system 160 has a static analysis component 120 configured to generate 1200 from the program code 111 a control flow graph, also referred to as CFG hereinafter. The CFG represents all paths that can be traversed through the execution of the respective program.

Static program analysis is the analysis of computer software that is performed at compile time without actually executing programs. The analysis of the program can be performed on some version of the source code or on some form of the respective object code. Available tools, such as for example LLVM (provided by The LLVM Compiler Infrastructure, available at www.llvm.org) or GCC (the GNU Compiler Collection, available at https://gcc.gn-u.org/), can be used for performing the static analysis of the program code 111.

The static analysis component 120 is further configured to determine 1200 data dependencies within the program code 111 and to determine all basic blocks of the CFG providing potential insertion positions along paths where communication statements can be inserted to enable data flow between different processors at runtime. That is, the communication statements instruct particular processors to provide for data exchange between different processors at runtime.

In other words, a basic block includes a plurality of statements which are all executed at runtime if one of the statements of the basic block is executed. That is, a group of consecutive program code statements which are always executed sequentially can form such a basic block. For parallelization of the program code, the compiler 160 can receive 1300 a mapping which includes for each statement represented by the CFG an assignment of the statement to a particular processor P1 to Pn of a multi-processor system 190. For example, a mapper component 130 can assign a particular processor P1 to a particular basic block of the CFG. As a result, all statements of the particular basic block will be executed by the assigned particular processor P1. Alternatively, the mapper 130 can assign processors directly to single statements of the program code. Such mapper components are known in the art. In some implementations, the following criteria may be used for the processor assignment: for each statement, exactly one assignment to a processing element has to be obtainable and only processing elements available in the system may be assigned.

Examples for program code which can be subject to a static analysis include: program code based on a fourth generation array-based programming languages, also known as vector or multidimensional languages, and program code based on array-based programming languages which generalize operations on scalars to apply transparently to vectors, matrices, and higher-dimensional arrays. Array-based programming languages include MATLAB, Scilab, TK Solver, Octave, FreeMat, SageMath and the NumPy extension to Python. In these languages, an operation that operates on entire arrays can be called a vectorized operation regardless of whether it is executed on a vector processor or not.

Further, the static analysis component 120 identifies 1400 data dependencies between a first statement in a first basic block and a second statement in a second basic block where a data flow is indicated from a first processor P1 to a second processor P2 of the multi-processor system 190. In other words, after the various processors are assigned to the respective statements or basic blocks, a write statement with regards to a particular variable occurs in the first basic block whereas a read statement on the same particular variable occurs in the second basic block. In this case, a data dependency is identified which requires a transfer of the variable value (data flow) from the first processor P1 to the second processor P2.

Once the system has identified such data dependencies between statements requiring a data transfer at runtime to allow the program to be executed on multiple processors of the multi-processor system 190, the compiler 160 inserts corresponding communication statements into the program code to execute the required data transfer(s) for all variables with respective data dependencies. Therefore, all paths between the first basic block and the second basic block are identified 1500 in the generated control flow graph. In each possible path between a write and read statement for the same variable on different processors, such communication statements need to be inserted to ensure that at runtime any possible execution of the program is covered and the particular data flows are enabled.

Then, the compiler 160 determines 1600 all basic blocks providing potential insertion positions along the identified paths where communication statements can be inserted to enable the data flow at runtime. Any basic block which is part of any one of the previously identified paths between the basic blocks with a data dependency is a potential target for inserting the communication statements to enable the data flow.

The compiler 160 further has an evaluation function 140 to evaluate 1700 each potential insertion position with regard to its impact on the runtime execution of the program on the multi-processor system 190. The execution evaluation function may use weighting metrics for the evaluation of basic blocks wherein weights are defined in relation to the frequency of execution of the basic blocks. For example, a basic block in a loop structure may have a higher weight than a basic block which is executed only once in a main path because it is executed multiple times, and therefore, a communication statement in such a loop structure would create a significantly higher load for the execution than the basic block which is only executed once. A basic block in a main path may have a higher weight than a basic block in a branching path because the main path is always executed whereas branching paths are only executed if the program fulfills a corresponding branching condition. The weights of all possible branching paths in relation to the main path add up to the weight of a main path basic block.

Finally, the compiler 160 obtains optimized program code(s) 111-1 to 111-n. There can be one optimized program code for each processor of the multi-processor system 190 in case all processors P1 to Pn are used. If not all of the processors are used, there may be less optimized program codes than processors. Alternatively, each processor may receive the same program code and the system determines at runtime which part of the program code is to be executed by the respective processor. In this embodiment, the program code may already determine the number of processors which are to be used for execution of the program. At runtime, the system can then determine which processor will be used for executing a particular portion of the program. In case that a subset of the processors is used, the number of optimized program codes may be lower than the number of available processors. The compiler 160 has a code modifier component 150 which inserts 1800 coupled send and receive communication statements in each identified path at one or more insertion positions wherein each insertion position has an evaluation value which indicates optimal runtime execution of the program when executed on the multi-processor system 190. A pair of send and receive communication statements can be inserted as consecutive statements in one basic block or it may be split on two basic blocks on the same path in the CFG. Placing the statements in different basic blocks may improve the global scheduling of the program and therefore lead to better performance. The compiler ensures that each path has an equal number of send and receive statements.

In case of complex control flow graphs with many branching paths, determining 1600 all basic blocks may include determining at least one potential set of insertion positions such that for each set of insertion positions each identified path is covered by at least one insertion position of the set. In this embodiment inserting 1800 the communication statements includes inserting pairs of send and receive communication statements at a particular set of insertion positions such that the evaluation of the particular set of insertion positions out of the potential sets of insertion positions is optimal in view of the respective evaluation values. This ensures that for each branching path optimal insertion positions are used when inserting the communication statements.

The multi-processor system 190 can then execute 1900 the optimized program code(s) on the respective processors. For example, the first basic block is executed by the first processor and the second basic block is executed by the second processor and the execution of inserted communication statements causes a data transfer from the first processor to the second processor in accordance with the identified data dependency.

Figure 3:
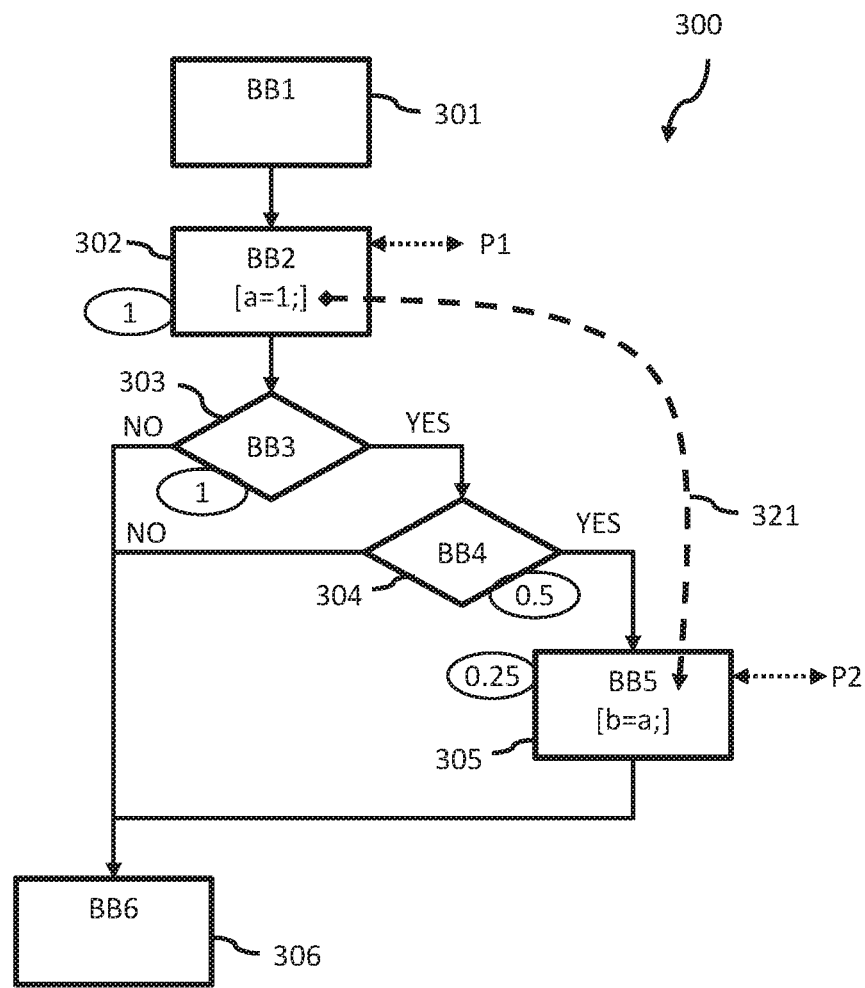
FIG. 3 is a simplified first control flow graph example with data flow across multiple processors.

FIG. 3 is a simplified first control flow graph 300 example with data flow across two processors P1 and P2. The CFG 300 is the result of a static analysis of a respective program code. Six basic blocks 301 to 306 (BB1 to BB6) are identified in the static analysis. BB1 301 starts the program. BB2 302 includes a write statement for variable a: [a=1;]. BB3 303 includes a conditional statement (e.g., an if-then statement or a case statement) with two branch options (NO and YES). The NO branch directly ends in the final basic block BB6 306. The YES branch leads to a further conditional statement in BB4 304 with two branch options (NO and YES). The NO branch again directly ends in the final basic block BB6 306. The YES branch leads to BB5 305 which includes a read statement on variable a: [b=a;] to assign the value of variable "a" to variable "b". From there, the program also ends with BB6 306.

In the example, BB2 302 is mapped to the first processor P1 and BB5 305 is mapped to the second processor P2. The assignment of the processors to the other basic blocks is not relevant for the optimization of the program code.

Therefore, the compiler identifies a data dependency 321 between the statements in basic blocks 302 and 305. That is, at runtime, the write and read statements with regards to variable "a" are executed by different processors. As a consequence, a data flow is required at runtime to transfer the value of variable "a" from the first processor P1 to the second processor P2 in order to guarantee proper execution of the program. The compiler can now identify all paths between BB2 302 and BB5 305 in the CFG 300. In the example, there is only one path leading from BB2 to BB5: BB2→BB3→BB4→BB5. Any one of the other paths in CFG 300 would bypass BB5 305.

Along the identified path from BB2 to BB5 the compiler can now determine all basic blocks which provide potential insertion positions where communication statements can be inserted to enable the data flow at runtime. In principle, any position on the identified path after the write statement in BB2 302 and before the read statement in BB5 can be used to insert coupled send and receive communication statements into the program code to ensure that the value of variable "a" is communicated from BB2 (to be executed by P1) to BB5 (to be executed by P2) before it is used at BB5. Any identified potential insertion position is appropriate to guarantee proper execution of the program at runtime on both processors P1 and P2. However, the different potential insertion positions may have significant impact on the execution behavior of the program at runtime. For example, dependent on the insertion position of the communication statements, the performance, power consumption, delay and/or resource requirements of the program at runtime are affected in a different manner. Therefore, it is advantageous to identify already at compile time which insertion position(s) can ensure an optimal execution behavior of the program at runtime.

The compiler uses an execution evaluation function to obtain optimized program code(s) for each processor of the multi-processor system wherein each basic block of the respective CFG is mapped to one of the processors (i.e., for each basic block, one particular processor is assigned to the respective basic block). The evaluation function evaluates each potential insertion position regarding its impact on the runtime execution of the program. For this purpose, the execution evaluation function uses weighting metrics for the evaluation of the basic blocks 302 to 305. The weights are defined in relation to the frequency of execution of the basic blocks and illustrated as values shown in an elliptic shape tied to the respective basic block. In the example, a basic block which is always executed at runtime, receives the evaluation value "1". In CFG 300, BB2 302 and BB3 303 are always executed at runtime. In other words, both basic blocks belong to any possible path of CFG 300. As a consequence, inserting communication statements in basic blocks 302 or 303 will execute such statement at runtime in any case—even if the program would not even get to BB5 305 at all because a NO condition would apply and BB5 is bypassed.

In the example, the conditional statements of BB3 303 and BB4 304 cause a branching of the program flow in a NO and a YES branch. As a consequence, BB4 304 is not executed each time when the program is running but only if the YES condition of BB3 303 is fulfilled. Therefore, the weight of BB4 304 is lower. In the example, the weight assigned to BB4 by the execution evaluation function is "0.5". Advantageously, the weights of branches add up to the weight of the branching basic block BB3 303. In the example, two branches branch off BB3. Therefore, each of the branches may receive a weight of "0.5". The weight represents a kind of runtime execution probability for the respective basic block. Other weight distributions may be chosen if appropriate. For this reason the weight of BB4 304 in the example assigned by the evaluation function is "0.5". That is, inserting the communication statements in BB4 324 is already more advantageous for the runtime execution than in BB2 or BB3 because BB4 may be executed less frequently.

With the same reasoning, it is clear that BB5 305 which is on the YES branching path of BB4 is assigned an evaluation value of "0.25" (corresponding to "0.5" times the "0.5" value of BB4 304). As a consequence, an insertion position in BB5 305 before the read statement for variable "a" is the optimal insertion position with regards to the runtime execution behavior of the program. By placing the corresponding send and receive communication statements at this insertion position their number of executions of the statements is minimized for CFG 300 at runtime execution.

Figure 4:
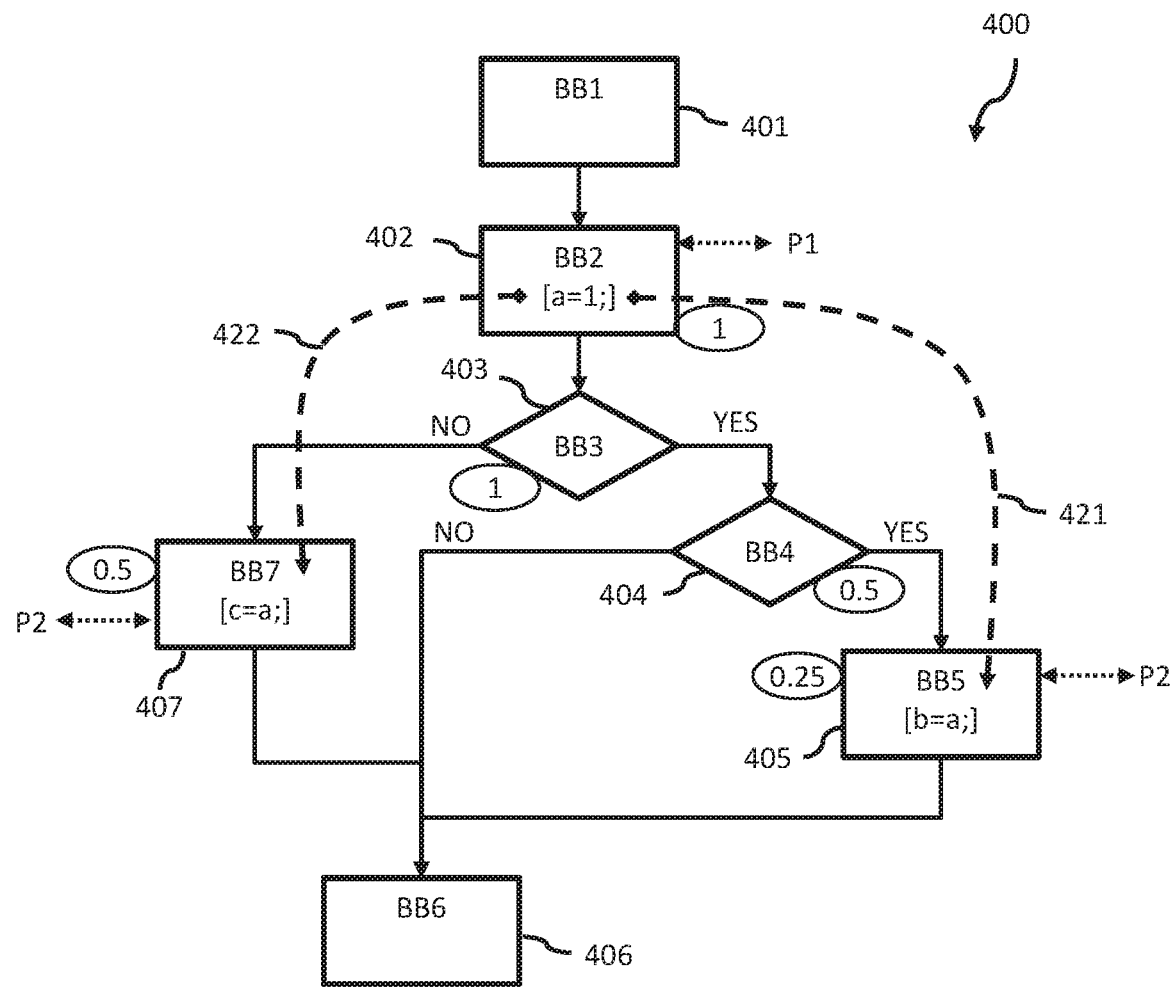
FIG. 4 is a simplified second control flow graph example with data flow across multiple processors.

FIG. 4 is a simplified second control flow graph 400 example with data flow across multiple processors P1, P2. However, the example is more complex than the example in FIG. 3. In CFG 400 multiple data dependencies 421, 422 exist. Similar as in FIG. 3, the program starts with BB1 401 and ends with BB6 406. The processor assignments of the basic blocks BB2 402 and BB5 405 and the corresponding path options through the basic blocks correspond to the previous example of FIG. 3. In addition, a further basic block BB7 407 on the NO branch of BB3 403 is identified by the static analysis. The further basic block BB7 also includes a read statement [c=a;] with regards to variable "a" and is assigned to the second processor P2. That is, a further data dependency 422 is determined between the statements of basic block BB2 402 and the basic block BB7 407. As a consequence, all paths of CFG 400 in relation to this data dependency 422 need to be identified by the compiler. In the example, only one path is leading from BB2 to BB7: BB2→BB3→BB7. Potential insertion positions for coupled send and receive communication statements are in basic block BB2 402 after the write statement for variable "a", in basic block BB3 403 and in basic block BB7 407 before the read statement for variable "a". The application of the evaluation function results in an evaluation value of "0.5" for BB7 407 because it is in a branching path of BB3 403. It is to be noted that the valuation values of both branches of BB3 add up to the evaluation value "1" of BB3 403 (being a main path basic block).

As a result, the compiler will insert the coupled communication statements in basic block BB7 407 and basic block BB5 405 before the respective read statements for variable "a" because the optimal execution behavior (lowest evaluation values) can be expected in this case. The overall evaluation value for this scenario is "0.75" (0.5(BB7)+0.25 (BB5)). An insertion in BB2 402 after the write statement or BB3 403 has a total evaluation value of "1". An insertion in BB4 404 and BB7 407 also has a total evaluation value of "1" (0.5(BB7)+0.5(BB4)). A person skilled in the art may use any other appropriate metrics to compute the optimal insertion positions. For example, a higher weight may indicate a lower frequency of execution in which case the highest evaluation values would indicate the respective insertion positions.

Figure 5:
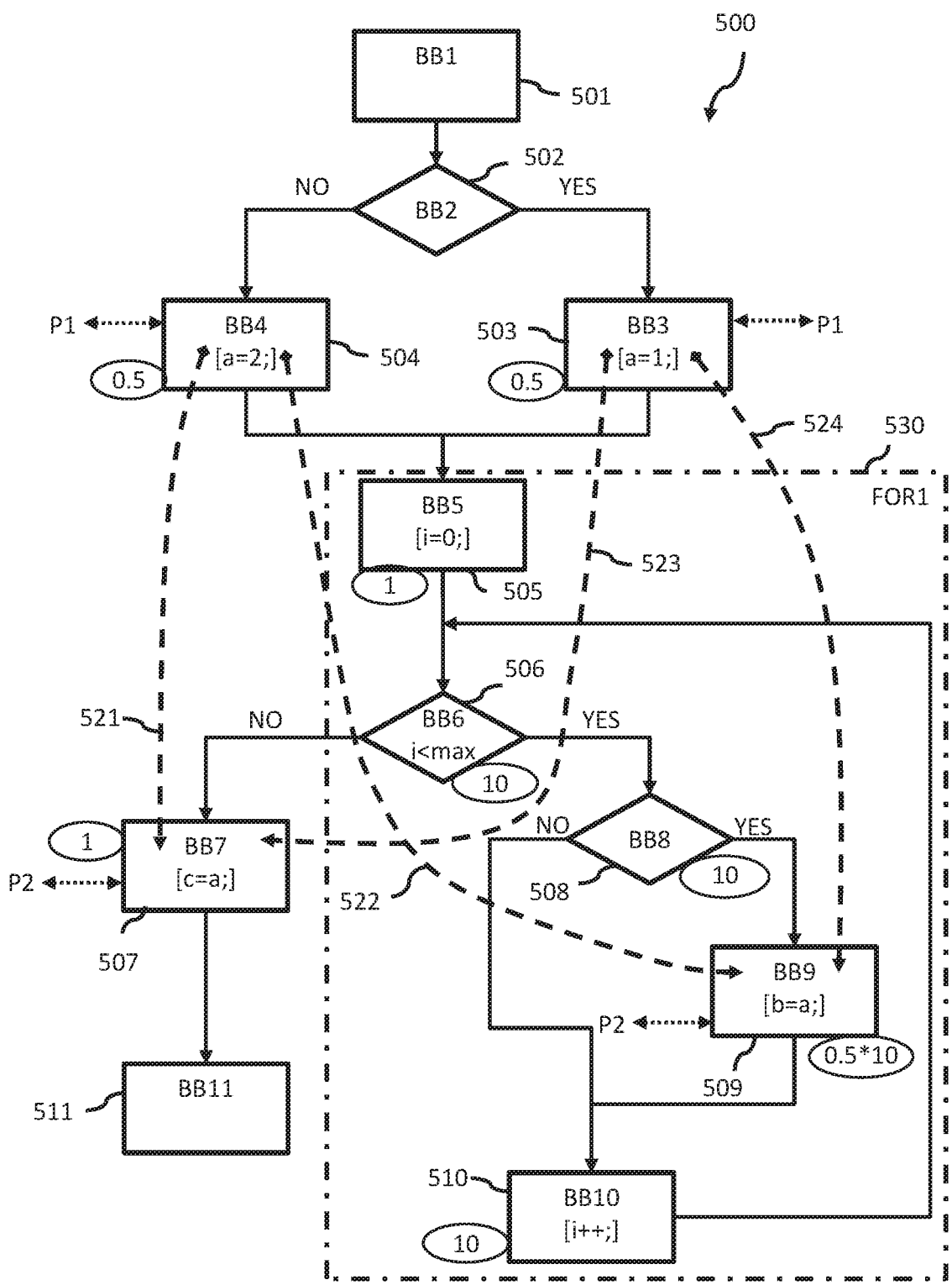
FIG. 5 is a simplified third control flow graph example with data flow across multiple processors.

FIG. 5 is another simplified control flow graph 500 example with data flow across multiple processors P1, P2.

CFG 500 starts with BB1 501 and ends with BB11 511. CFG 500 has a higher complexity compared to the previous examples because it includes two write statements for variable "a" ([a=2;] and [a=1;]) assigned to the first processor P1 and two read statements for variable "a" ([c=a;] and [b=a;]) assigned to the second processor P2. It also includes loop structure FOR1 530 wherein one of the read statements is part of the loop structure. CFG 500 is now explained in more detail.

For example, according to the code example 1, the program code in the C programming language on which basis CFG 500 is generated may include the following statements including the mapping received from the mapper 130:

Code Example 1:

```
01   P1:   if (...) {
02   P1:     a = 1;
03   P1:   } else {
04   P1:     a = 2;
05   P1:   }
06
07   P2:   for (i=0; i<max; ++i) {
08   P2:     if (...) {
09   P2:       b = a;
10   P2:     }
11   P2:   }
12
13   P1:   c = a;
```

Depending on the conditional statement in lines 01, 03, 05 of the code example (corresponding to BB2 502), the variable "a" is written with different values, either in line 04 (corresponding to basic block BB4 504—NO branch of BB2) or in line 02 (corresponding to BB3 503—YES branch of BB2). The two branches are merged again in basic block BB5 505 which is the start of the FOR1 loop 530 (lines 07 to 11) where the loop counter "i" is initialized (set to "0"). The next basic block BB6 506 corresponds to the conditional statement "i<max" in line 07 of the loop 530. BB6 checks within each loop iteration whether the loop counter "i" is smaller than a threshold value "max". As long as it is smaller, the lines 08 to 11 are executed.

The conditional statement in line 08 corresponds to basic block BB8 508. If the condition is true, the read statement for variable "a" in line 09 (corresponding to basic block BB9 509) is executed (YES branch of BB8) and the counter is incremented (line 07 "++i") corresponding to basic block BB10 510. Otherwise, the counter is directly incremented.

Once "i" reaches "max" (cf. line 07), the program exits the loop through the NO branch of BB6 506. Then, a further read statement of line 13 regarding variable "a" is executed (corresponding to BB7 507).

In the example, the basic blocks BB3 and BB4 containing the write statements for variable "a" are mapped to the first processor P1 whereas the basic blocks BB7 and BB9 containing the read statements for variable "a" are mapped to the second processor P2. In this example, the compiler determines four data dependencies 521 to 524. The first data dependency 521 between BB4 and BB7 corresponds to the path BB4→BB5→BB6→BB7. The second data dependency 522 between BB4 and BB9 corresponds to the path BB4→BB5 →BB6→BB8→BB9. The third data dependency between BB3 and BB7 corresponds to the path BB3→BB5→BB6→BB7. The fourth data dependency between BB3 and BB9 corresponds to the path BB3→BB5→BB6→BB8→BB9. All four paths are identified by the compiler and analyzed with regards to potential insertion positions for communication statements along these paths. In other words, the evaluation function of the compiler evaluates all basic blocks along all identified paths with the earlier described evaluation metrics. In general, for one data dependency there can be multiple paths which are affected by the data dependency.

Basic blocks BB3 503 and BB4 504 are in branch paths of BB2 and both receive an evaluation value of "0.5" according to the example metrics. Although BB5 505 is part of the FOR1 loop structure, it is only executed once during initialization of the loop counter and therefore belongs to the main path of CFG 500. As a result, its evaluation value is "1". BB6 506 is the first basic block which is executed with each loop iteration until the loop counter reaches "max". In the example, the weight for basic blocks in loop structures is assumed 10 times higher than the initialization basic block BB5. Therefore, BB6 as being part of the main path within the loop receives the evaluation value "10". As long as the loop counter is less than "max", the YES branch of BB6 is executed. Only at the very end of the loop execution, the exit condition "i=max" is met and the NO branch will be executed. That is, the loop branch cannot be handled like the previously explained if-branches because BB8 508 is also executed with each loop iteration. Therefore, BB8 also receives an evaluation value of "10". Within the loop BB8 includes a conditional if statement (line 08) where the YES branch leads to BB9 509 including the read statement for variable "a". The NO branch leads directly to incrementing the loop counter in BB10 510. In this case, the if-branches of BB8 are valued with "0.5". However, because the if-branches occur within the loop, the values are multiplied with the loop weight of "10" thus resulting in an evaluation value of "5" according to the example metrics. BB10 for incrementing the counter is also executed with each loop iteration and therefore receives the evaluation value "10".

Once the program exits the loop at "i=max" (NO branch of BB6), a further read statement (line 13) with regards to variable "a" is executed in BB7 507. Although BB7 is on a branch path of BB6, it will always be executed after the loop. Therefore, it is considered to be on the main path of the program and receives an evaluation value of "1" according to the example metrics.

When selecting the optimal insertion positions for the send and receive communication statements, the compiler takes into account all possible paths for each identified dependency. That is, it determines at least one potential set of insertion positions such that for each set each identified path is covered by at least one communication statement of the set. The communication statements are then inserted at a particular set of insertion positions such that the evaluation of the particular set of insertion positions out of the potential sets of insertion positions is optimal in view of the respective evaluation values.

In the example of FIG. 5, the optimal insertion positions are in BB4 504 and BB3 503 after respective write statements for variable "a". These positions cover all possible paths regarding the four identified data dependencies with only two pairs of communication statements evaluated with the lowest evaluation values of "0.5". That is, in total the overall evaluation value is "1" which is the lowest possible value that can be achieved and therefore indicates the optimal configuration. BB5 has the same evaluation value of "1" and would lead to the same result. However, because it is the initialization block of a for-loop, inserting communications statements in BB5 is only possible when using uncommon structs in the C language which may cause problems for the execution. Creation of a new basic block directly before BB5 would have the same behavior as inserting the communication in BB3 and BB4 and is therefore another option (cf., code example 3).

For example, when inserting the communication statements in BB7 and BB9 before the read statements, the overall evaluation value for this configuration would still be "6" indicating a significantly worse execution behavior than the optimal configuration.

The following code example 2 illustrates optimized program code for processors P1 and P2 including the inserted send and receive communication statements. A person skilled in the art can provide compiler means to adjust the control flow graph in a way that the optimized program code can be separated into two optimized program codes tailored to the respective processors P1, P2. The coupled communication statements inserted in lines 03, 04 correspond to the insertion position in BB3. The coupled communication statements inserted in lines 07, 08 correspond to the insertion position in BB4.

Code Example 2:

```
01    P1:    if (...) {
02    P1:      a = 1;
03    P1:    send(a, P2);
04    P2:    receive(a, P1);
05    P1:    } else {
06    P1:      a = 2;
07    P1:    send(a, P2);
08    P2:    receive(a, P1);
09    P1:    }
10
11    P2:    for (i=0; i<max; ++i) {
12    P2:      if (...) {
13    P2:        b = a;
14    P2:      }
15    P2:    }
16
17    P2:    c = a;
```

The following code example 3 illustrates the creation of a new basic block before BB5 to insert the receive communication statement in line 09. In this example, the coupled send (lines 03, 05) and receive instructions (line 09) are separated and not inserted as consecutive statements. Because the receive statement is taken out of the branched basic blocks BB3, BB4 and inserted in the main path before BB5 only a single receive statement is needed. Therefore, separating coupled communication statements can reduce the size of the optimized program code which may become relevant in environments with memory constraints, such as for example, embedded systems.

Code Example 3:

```
01    P1:    if (...) {
02    P1:      a = 1;
03    P1:    send(a, P2);
04    P1:    } else {
05    P1:      a = 2;
06    P1:    send(a, P2);
07    P1:    }
08
09    P2:    receive(a, P1);
10
11    P2:    for (i=0; i<max; ++i) {
12    P2:      if (...) {
13    P2:        b = a;
14    P2:      }
17    P2:    }
16
17    P2:    c = a;
```

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a compiler system for optimizing a program for multi-processor system execution, the compiler system including: an interface component configured to loading from a storage component program code of a program to be executed by one or more processors (p1 to pn) of a multi-processor system and to provide one or more optimized program codes to the storage component, where each optimized program code is configured for execution by one or more processors (p1 to pn); a static analysis component configured to, generating from the program code a control flow graph representing traversable paths through the execution of the respective program, determining data dependencies within the program code, and determining a plurality of basic blocks of the control flow graph providing potential insertion positions along paths in which communication statements are adapted to be inserted to enable data flow between different processors at runtime; an evaluation function component configured to evaluate each potential insertion position with respect to an impact of a respective potential insertion position on program execution on the multi-processor system at runtime by using a predefined execution evaluation function; and a code modification component configured to obtain the one or more optimized program codes by inserting coupled send and receive communication statements in each relevant path of the control flow graph at one or more insertion positions, where each insertion position has an evaluation value which indicates optimal runtime execution for the program when executed on the multi-processor system. Other embodiments of this aspect include corresponding computer systems, apparatus, and computer programs recorded on one or more computer storage devices, each configured to perform the actions of the methods.

Implementations may include one or more of the following features. The system where the static analysis component is further configured to identify at least one data dependency between a first statement in a first basic block and a second statement in a second basic block where a data flow is indicated from a first processor (p1) to a second processor (p2) of the multi-processor system, and where the static analysis component further identifies a plurality of paths between the first basic block and the second basic block in the control flow graph. The system where the static analysis component is further configured to determine at least one potential set of insertion positions such that for each set each identified path is covered by at least one insertion position of the set, and where the code modification component is further configured to insert coupled send and receive communication statements at the particular set of insertion positions such that the evaluation of the particular set of insertion positions out of the potential sets of insertion positions is optimal in view of the respective evaluation values. The system where the program code does not include dynamic pointer instructions or function calls with variables passed by reference. The system where the execution evaluation function uses weighting metrics for the evaluation of basic blocks where weights are defined in relation to the frequency of execution of the basic blocks, and where, a basic block in a loop structure has a higher weight than a basic block which is executed once in a main path, and a basic block in a main path has a higher weight than a basic block in a branching path. The system where a pair of send and receive communication statements are consecutive statements in one of the one or more optimized program codes. Implementations of the described techniques may include hardware, a method or process, or computer software on a computer-accessible medium.

In another general aspect, a computer-implemented method and a computer program product for optimizing a program for multi-processor system execution may be executed at compile-time and may include loading a program code of the program wherein the program is to be executed by at least one processor (P1 to Pn). As a result of a static analysis of the program code, the method may include generating a control flow graph representing traversable paths through the execution of the program, and determining data dependencies between pairs of statements of the program code wherein sets of statements are represented by basic blocks of the control flow graph; receiving a mapping which includes for each statement an assignment of the statement to a particular processor (P1 to Pn) of a multi-processor system; identifying at least one data dependency between a first statement in a first basic block and a second statement in a second basic block where a data flow is indicated from a first processor (P1) to a second processor (P2) of the multi-processor system; identifying all paths between the first basic block and the second basic block in the control flow graph; determining all basic blocks providing potential insertion positions along the identified paths where communication statements are adapted to be inserted to enable the data flow at runtime; evaluating, by using a predefined execution evaluation function, each potential insertion position with respect to an impact on the execution of the program on the multi-processor system; and obtaining optimized program code by inserting coupled send and receive communication statements in each identified path at one or more insertion positions wherein each insertion position has an evaluation value which indicates optimal runtime execution of the program when executed on the multi-processor system.

The method and computer program product may also include executing the optimized program code on the multi-processor system wherein the first basic block is executed by the first processor and the second basic block is executed by the second processor and the execution of inserted communication statements causes a data transfer from the first processor to the second processor. In some implementations, the program code does not include dynamic pointer instructions or function calls with variables passed by reference. In some implementations, the program code is derived of a fourth generation array-based programming language. In some implementations, the execution evaluation function uses weighting metrics for the evaluation of basic blocks wherein weights are defined in relation to a frequency of execution of the basic blocks.

In some implementations, a basic block in a loop structure has a higher weight than a basic block on a path outside of a loop structure, and a basic block outside a branching path has a higher weight than a basic block in a branching path. In some implementations, a pair of send and receive communication statements is inserted as consecutive statements. In some implementations, determining all basic blocks includes: determining at least one potential set of insertion positions such that for each set each identified path is covered by at least one communication statement of the set, and wherein inserting the communication statements includes inserting coupled send and receive communication statements at a particular set of insertion positions such that the evaluation of the particular set of insertion positions out of the potential sets of insertion positions is optimal in view of the respective evaluation values.

FIG. 6 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may include the data storage components and/or processing components of agent devices as shown in FIG. 1. The components shown here, their connections and relationships, and their functions, are meant to be exemplary only, and are not meant to limit implementations of the present disclosures described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A compiler system for optimizing a program for multi-processor system execution, the compiler system comprising:

an interface component configured to load from a storage component program code of a program to be executed by one or more processors (P1 to Pn) of a multi-processor system and to provide one or more optimized program codes to the storage component, wherein each optimized program code is configured for execution by one or more processors (P1 to Pn);

a static analysis component configured to:
generate, from the program code, a control flow graph representing traversable paths through the execution of the respective program,
determine data dependencies between pairs of statements of the program code, wherein sets of statements are represented by basic blocks of the control flow graph,
receive a mapping which includes, for each statement in the sets of statements, an assignment of the respective statement to a particular processor (P1 to Pn) of a multi-processor system,
identify at least one data dependency between a first statement in a first basic block and a second statement in a second basic block, wherein a data flow is indicated from a first processor (P1) to a second processor (P2) of the multi-processor system,
identify all paths between the first basic block and the second basic block in the control flow graph, and
determine a plurality of basic blocks of the control flow graph providing potential insertion positions along the identified paths in which communication statements are adapted to be inserted to enable data flow between different processors at runtime; and an evaluation function component configured to evaluate each potential insertion position with respect to an impact of a respective potential insertion position on program execution on the multi-processor system at runtime by using a predefined execution evaluation function using weighting metrics for the evaluation of the plurality of basic blocks wherein each weight represents a runtime execution probability for the respective basic block; and a code modification component configured to obtain the one or more optimized program codes by inserting coupled send and receive communication statements in each identified path of the control flow graph where communication statements are inserted to enable data flow between different processors at runtime at one or more insertion positions, wherein each insertion position has an evaluation value which indicates optimal runtime execution for the program when executed on the multi-processor system.

2. The system of claim 1, wherein the static analysis component is further configured to determine at least one potential set of insertion positions such that for each set, each identified path is covered by at least one insertion position of the set, and wherein the code modification component is further configured to insert coupled send and receive communication statements at a particular set of insertion positions such that the evaluation of the particular set of insertion positions out of the potential sets of insertion positions is optimal in view of the respective evaluation values.

3. The system of claim 1, wherein the program code does not include dynamic pointer instructions or function calls with variables passed by reference.

4. The system of claim 1, wherein the execution evaluation function uses weighting metrics for the evaluation of basic blocks wherein weights are defined in relation to a frequency of execution of the basic blocks, and wherein, a basic block in a loop structure has a higher weight than a basic block which is executed once in a main path, and a basic block in a main path has a higher weight than a basic block in a branching path.

5. The system of claim 1, wherein a pair of send and receive communication statements are consecutive statements in one of the one or more optimized program codes.

6. A computer-implemented method for optimizing a program for multi-processor system execution, the method being executed at compile-time, the method comprising:
loading a program code of the program, wherein the program is to be executed by at least one processor (P1 to Pn);
as a result of a static analysis of the program code, generating a control flow graph representing traversable paths through the execution of the program, and determining data dependencies between pairs of statements of the program code wherein sets of statements are represented by basic blocks of the control flow graph;
receiving a mapping which includes, for each statement, an assignment of the statement to a particular processor (P1 to Pn) of a multi-processor system;
identifying at least one data dependency between a first statement in a first basic block and a second statement in a second basic block where a data flow is indicated from a first processor (P1) to a second processor (P2) of the multi-processor system;
identifying all paths between the first basic block and the second basic block in the control flow graph;
determining all basic blocks providing potential insertion positions along the identified paths where communication statements are adapted to be inserted to enable the data flow at runtime;
evaluating, by using a predefined execution evaluation function, each potential insertion position with respect to an impact on the execution of the program on the multi-processor system, the evaluation function using weighting metrics for the evaluation of the basic blocks wherein each weight represents a runtime execution probability for the respective basic block; and
obtaining optimized program code by inserting coupled send and receive communication statements in each identified path of the control flow graph where communication statements are inserted to enable data flow between different processors at runtime at one or more insertion positions, wherein each insertion position has an evaluation value which indicates optimal runtime execution of the program when executed on the multi-processor system.

7. The method of claim 6, further comprising:
executing the optimized program code on the multi-processor system, wherein the first basic block is executed by the first processor and the second basic block is executed by the second processor and the execution of inserted communication statements causes a data transfer from the first processor to the second processor.

8. The method of claim 6, wherein the program code does not include dynamic pointer instructions or function calls with variables passed by reference.

9. The method of claim 6, wherein the program code is derived of a fourth generation array-based programming language.

10. The method of claim 6, wherein the execution evaluation function uses weighting metrics for the evaluation of basic blocks wherein the weights are defined in relation to a frequency of execution of the basic blocks.

11. The method of claim 10, wherein a basic block in a loop structure has a higher weight than a basic block on a path outside of a loop structure, and a basic block outside a branching path has a higher weight than a basic block in a branching path.

12. The method of claim 6, wherein a pair of send and receive communication statements is inserted as consecutive statements.

13. The method of claim 6, wherein determining all basic blocks includes:
determining at least one potential set of insertion positions such that for each set each identified path is covered by at least one communication statement of the set, and
wherein inserting the communication statements includes inserting coupled send and receive communication statements at a particular set of insertion positions such that the evaluation of the particular set of insertion positions out of the potential sets of insertion positions is optimal in view of the respective evaluation values.

14. A computer program product that when loaded into a memory of a computing device and executed by at least one processor of the computing device executes the steps of:
loading a program code of the program, wherein the program is to be executed by at least one processor (P1 to Pn);
as a result of a static analysis of the program code, generating a control flow graph representing traversable paths through the execution of the program, and determining data
dependencies between pairs of statements of the program code wherein sets of statements are represented by basic blocks of the control flow graph;
receiving a mapping which includes for each statement an assignment of the statement to a particular processor (P1 to Pn) of a multi-processor system;
identifying at least one data dependency between a first statement in a first basic block and a second statement in a second basic block where a data flow is indicated from a first processor (P1) to a second processor (P2) of the multi-processor system;
identifying all paths between the first basic block and the second basic block in the control flow graph;
determining all basic blocks providing potential insertion positions along the identified paths where communication statements are adapted to be inserted to enable the data flow at runtime;
evaluating, by using a predefined execution evaluation function, each potential insertion position with respect to an impact on the execution of the program on the multi-processor system, the evaluation function using weighting metrics for the evaluation of the basic blocks wherein each weight represents a runtime execution probability for the respective basic block; and
obtaining optimized program code by inserting coupled send and receive communication statements in each identified path of the control flow graph where communication statements are inserted to enable data flow between different processors at runtime at one or more insertion positions wherein each insertion position has an evaluation value which indicates optimal runtime execution of the program when executed on the multiprocessor system.

15. The computer program product of claim 14, further comprising:
executing the optimized program code on the multiprocessor system wherein the first basic block is executed by the first processor and the second basic block is executed by the second processor and the execution of inserted communication statements causes a data transfer from the first processor to the second processor.

16. The computer program product of claim 14, wherein the program code is derived of a fourth generation array-based programming language.

17. The computer program product of claim 14, wherein the weights are defined in relation to a frequency of execution of the basic blocks.

18. The computer program product of claim 17, wherein a basic block in a loop structure has a higher weight than a basic block on a path outside of a loop structure, and a basic block outside a branching path has a higher weight than a basic block in a branching path.

19. The computer program product of claim 14, wherein determining all basic blocks includes:
determining at least one potential set of insertion positions such that for each set each identified path is covered by at least one communication statement of the set, and
wherein inserting the communication statements includes inserting coupled send and receive communication statements at a particular set of insertion positions such that the evaluation of the particular set of insertion positions out of the potential sets of insertion positions is optimal in view of the respective evaluation values.

* * * * *